United States Patent
Jess (10) Patent No.: US 8,713,267 B2
(45) Date of Patent: Apr. 29, 2014

(54) METHOD AND SYSTEM FOR DYNAMIC STORAGE TIERING USING ALLOCATE-ON-WRITE SNAPSHOTS

(75) Inventor: Martin Jess, Erie, CO (US)

(73) Assignee: LSI Corporation, San Jose, CA (US)

( * ) Notice: Subject to any disclaimer, the term of this patent is extended or adjusted under 35 U.S.C. 154(b) by 707 days.

(21) Appl. No.: 12/995,792

(22) PCT Filed: Mar. 31, 2009

(86) PCT No.: PCT/US2009/001991
§ 371 (c)(1),
(2), (4) Date: Dec. 2, 2010

(87) PCT Pub. No.: WO2010/085228
PCT Pub. Date: Jul. 29, 2010

(65) Prior Publication Data
US 2011/0078398 A1     Mar. 31, 2011

Related U.S. Application Data (60) Provisional application No. 61/205,810, filed on Jan. 23, 2009.

(51) Int. Cl.
*G06F 13/00* (2006.01)
(52) U.S. Cl.
USPC .................................. 711/162; 711/E12.068
(58) Field of Classification Search
None
See application file for complete search history.

(56) References Cited

U.S. PATENT DOCUMENTS

| | | | |
|---|---|---|---|
| 6,170,037 B1 * | 1/2001 | Blumenau | 711/114 |
| 6,311,252 B1 | 10/2001 | Raz | |
| 7,191,304 B1 | 3/2007 | Cameron et al. | |
| 7,225,211 B1 | 5/2007 | Colgrove et al. | |
| 7,334,007 B2 * | 2/2008 | Cabrera et al. | 707/776 |
| 7,822,939 B1 * | 10/2010 | Veprinsky et al. | 711/170 |
| 8,527,720 B2 * | 9/2013 | Jess | 711/162 |
| 2002/0133681 A1 * | 9/2002 | McBrearty et al. | 711/165 |
| 2004/0123031 A1 * | 6/2004 | Kiselev et al. | 711/114 |
| 2005/0169064 A1 * | 8/2005 | Kiselev et al. | 365/189.05 |
| 2006/0010169 A1 | 1/2006 | Kitamura | |
| 2008/0010284 A1 | 1/2008 | Beck | |
| 2008/0162843 A1 * | 7/2008 | Davis et al. | 711/162 |
| 2008/0189572 A1 * | 8/2008 | McBride et al. | 714/5 |
| 2008/0195826 A1 | 8/2008 | Yamazaki et al. | |
| 2011/0078398 A1 | 3/2011 | Jess | |
| 2011/0283075 A1 * | 11/2011 | Jess et al. | 711/162 |

(Continued)

FOREIGN PATENT DOCUMENTS

| | | |
|---|---|---|
| EP | 1826662 A2 | 8/2007 |
| JP | 09-006678 A | 1/1997 |

(Continued)

*Primary Examiner* — Sean D Rossiter
(74) *Attorney, Agent, or Firm* — Suiter Swantz pc llo (57) ABSTRACT

Systems and methods for dynamic storage tiering using snapshot functionality are disclosed. A point-in-time copy of a virtual volume including a storage hot-spot is created; write operations directed to the virtual volume may be redirected to a point-in-time temporary virtual volume. The virtual volume segment, including the hot-spot, is copied from a first storage pool to a second storage pool. Finally, a logical block address mapping of the virtual volume is reconfigured to reference the virtual volume segment copy in the second storage pool. Upon deletion of the point-in-time copy of the virtual volume, the virtual volume segment copy in the second storage pool may be updated with data from the point-in-time temporary virtual volume.

12 Claims, 9 Drawing Sheets

(56) References Cited

U.S. PATENT DOCUMENTS

| | | | |
|---|---|---|---|
| 2012/0047108 A1* | 2/2012 | Mandel et al. | 707/639 |
| 2012/0331261 A1* | 12/2012 | Farrell et al. | 711/206 |
| 2012/0331264 A1* | 12/2012 | Farrell et al. | 711/207 |

FOREIGN PATENT DOCUMENTS

| | | |
|---|---|---|
| JP | 2001-093220 A | 4/2001 |
| JP | 2002-073383 A | 3/2002 |
| JP | 2005-85117 A | 3/2005 |
| JP | 2005-310159 A | 4/2005 |
| JP | 2007-79787 A | 3/2007 |
| JP | 2007-220112 A | 8/2007 |
| JP | 2008-197779 A | 8/2008 |
| WO | WO2007009910 A2 | 1/2007 |

* cited by examiner

METHOD AND SYSTEM FOR DYNAMIC STORAGE TIERING USING ALLOCATE-ON-WRITE SNAPSHOTS

BACKGROUND

Dynamic Storage Tiering (DST) is a concept of grouping storage devices into tiers based on their performance characteristics and relocating data dynamically across the devices to leverage their specific capabilities. It is desirable that a DST system perform this relocation while data remains online and accessible.

For performance management, data that has a high activity or load level may be relocated it to high performing storage tiers. Alternately, data with a low activity level may be relocated to lower performing storage tiers in order to provide increased capacity in high-performance storage tiers.

SUMMARY

The present disclosure describes systems and methods for dynamic storage tiering A method for dynamic storage tiering may comprise: creating a point-in-time copy of a virtual volume including a storage hot-spot; copying a virtual volume segment including the hot-spot from a first storage pool to a second storage pool; and reconfiguring a logical block address mapping of the virtual volume to reference the virtual volume segment copy in the second storage pool.

A system for dynamic storage tiering may comprise: means for creating a point-in-time copy of a virtual volume including a storage hot-spot; means for copying a virtual volume segment including the hot-spot from a first storage pool to a second storage pool; and means for reconfiguring a logical block address mapping of the virtual volume to reference the virtual volume segment copy in the second storage pool

BRIEF DESCRIPTION OF THE DRAWINGS

The numerous advantages of the disclosure may be better understood by those skilled in the art by reference to the accompanying figures in which.

DETAILED DESCRIPTION

In the following detailed description, reference may be made to the accompanying drawings, which form a part hereof. In the drawings, similar symbols typically identify similar components, unless context dictates otherwise. The illustrative embodiments described in the detailed description, drawings, and claims may be not meant to be limiting. Other embodiments may be utilized, and other changes may be made, without departing from the spirit or scope of the subject matter presented here.

Figure 1:
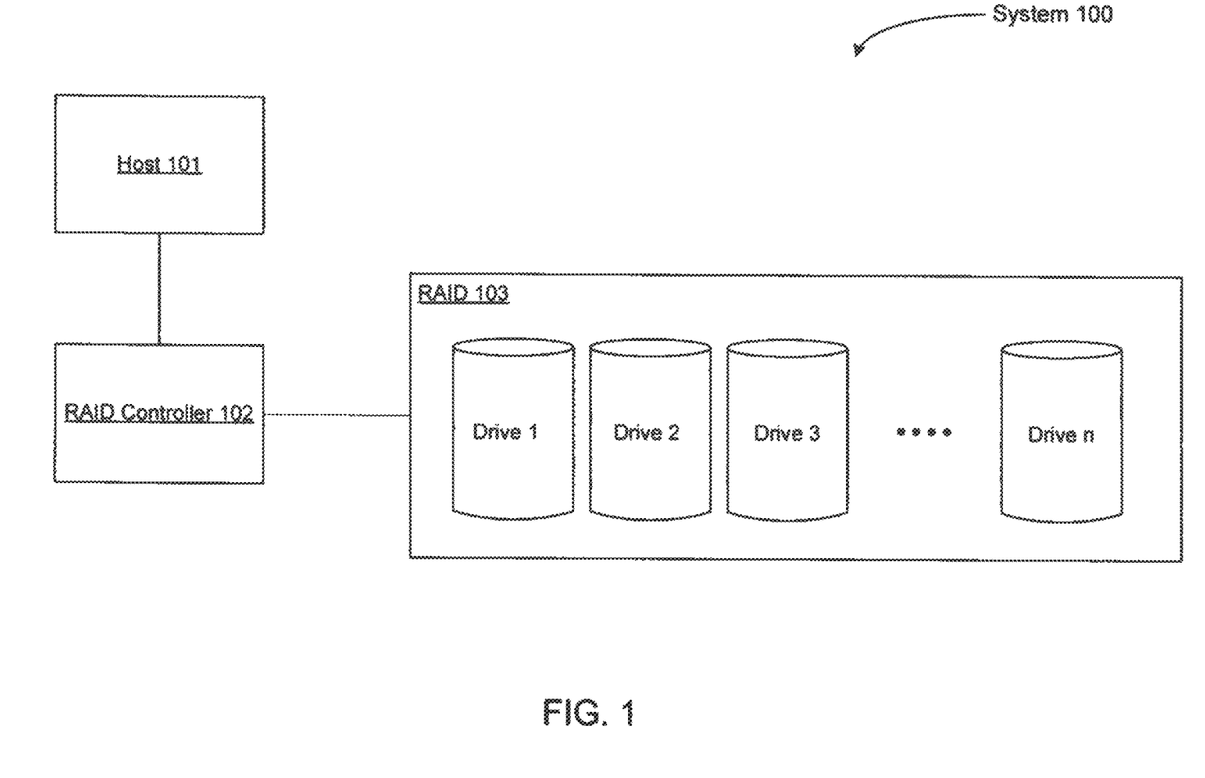
FIG. 1 shows a data storage system.

Referring to FIG. 1, an illustrative representation of a mass storage system 100 comprising a host 101 computing device, a RAID controller 102, and a RAID 103 is shown. The RAID controller 102 may include volume management circuitry/software whereby the RAID controller 102 can process read/write requests of the host 101 accessing various logical volumes configured on the RAID 103. The RAID 103 may include a drive group having n drives.

Referring to FIG. 1, one or more physical drives (e.g. drive 0-drive n) may be logically partitioned into one or more virtual drives (e.g. virtual drive 104A-virtual drive 104C of RAID 103). Portions of one or more virtual drives may be further partitioned into storage pools (e.g. storage pool 105A, storage pool 105B, etc.). A storage pool may be defined as one or more physical drives (or one or more logical partitions of the one or more physical drives) which have similar performance characteristics. For example, storage pool 105A (i.e. drive 0) may include high-performance Solid State Drives (SSDs) whereas storage pool 105B (i.e. drive 1 and drive 2) may include lower performance devices such as Serial ATA (SATA) Hard Disk Drives (HDDs). Factors which may distinguish higher-performance storage pools from lower-performance storage pools may include numbers of I/O operations processed per unit time, number of bytes read or written per unit time, and/or average response time for an I/O request.

In order to enhance overall system performance, it may be desirable to allocate data having a high activity level (e.g. high numbers of I/O requests are addressed to the data) to high performance storage pools while also allocating data with a low activity levels to low performance storage pools. To affect an efficient DST solution, the size of the data blocks moved between storage pools may be smaller than a complete SCSI logical unit (LU).

For a given LU, data with a high activity level may be identified as a logical block address (LBA) range within an LU. Such an LBA range with significant activity load compared to the rest of the LU may be referred to as a hot-spot. A LU may contain more than one hot-spot.

A storage pool in which hot-spot currently exists may be referred to as a source storage pool. A storage pool that a hot-spot may be moved to may be referred to as a destination storage pool. It should be noted that hot-spots may refer data which is accessed frequently and may be moved to a higher-performance storage pool. Alternately, data which is accessed infrequently may be referred to as a cold-spot and may be moved to a lower-performance storage pool utilizing the same systems and methods as described herein with respect to hot-spot movement.

A hot-spot may be identified by the RAID controller 102 by monitoring the address locations for I/O requests received from the host 101. Upon exceeding a I/O request threshold (e.g. exceeding a specified request rate, number of requests, etc.), for a particular segment of LBAs in a given storage pool those LBAs may be designated as a hot-spot and subject to relocation to a storage pool having alternate performance characteristics.

Figure 2:
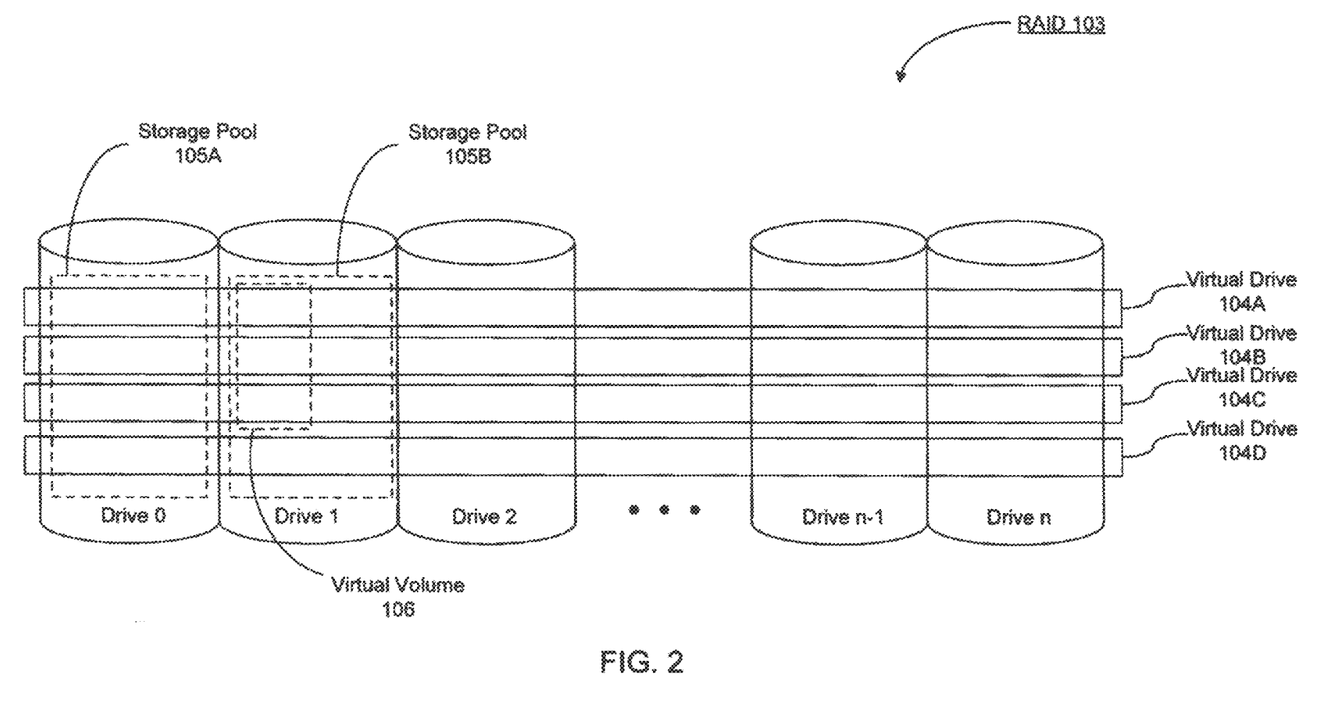
FIG. 2 shows a data storage system.

Referring to FIG. 2, a virtual volume 106 may be provisioned from the capacity of one or more storage pools. For example, storage pool 105B may include LBAs from one or more virtual drives (e.g. virtual drive LBA segment 107A of the portion of virtual drive 104A allocated to physical drive 0; virtual drive LBA segment 107B of the portion of virtual drive 104B allocated to physical drive 1; virtual drive LBA segment 107C of the portion of virtual drive 104C allocated to physical drive 2; etc.)

Figure 3:
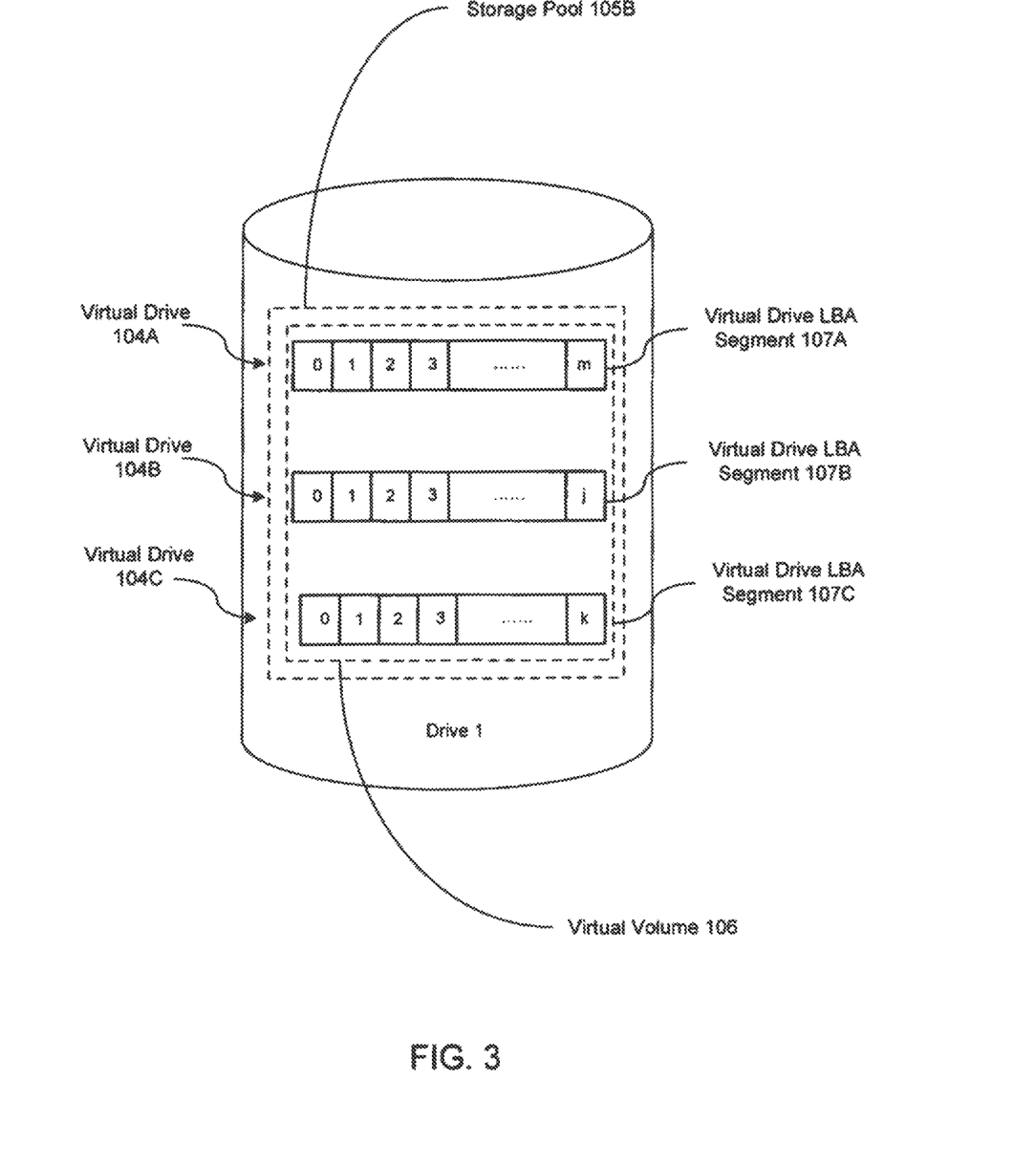
FIG. 3 shows a data storage system.
Figure 4:
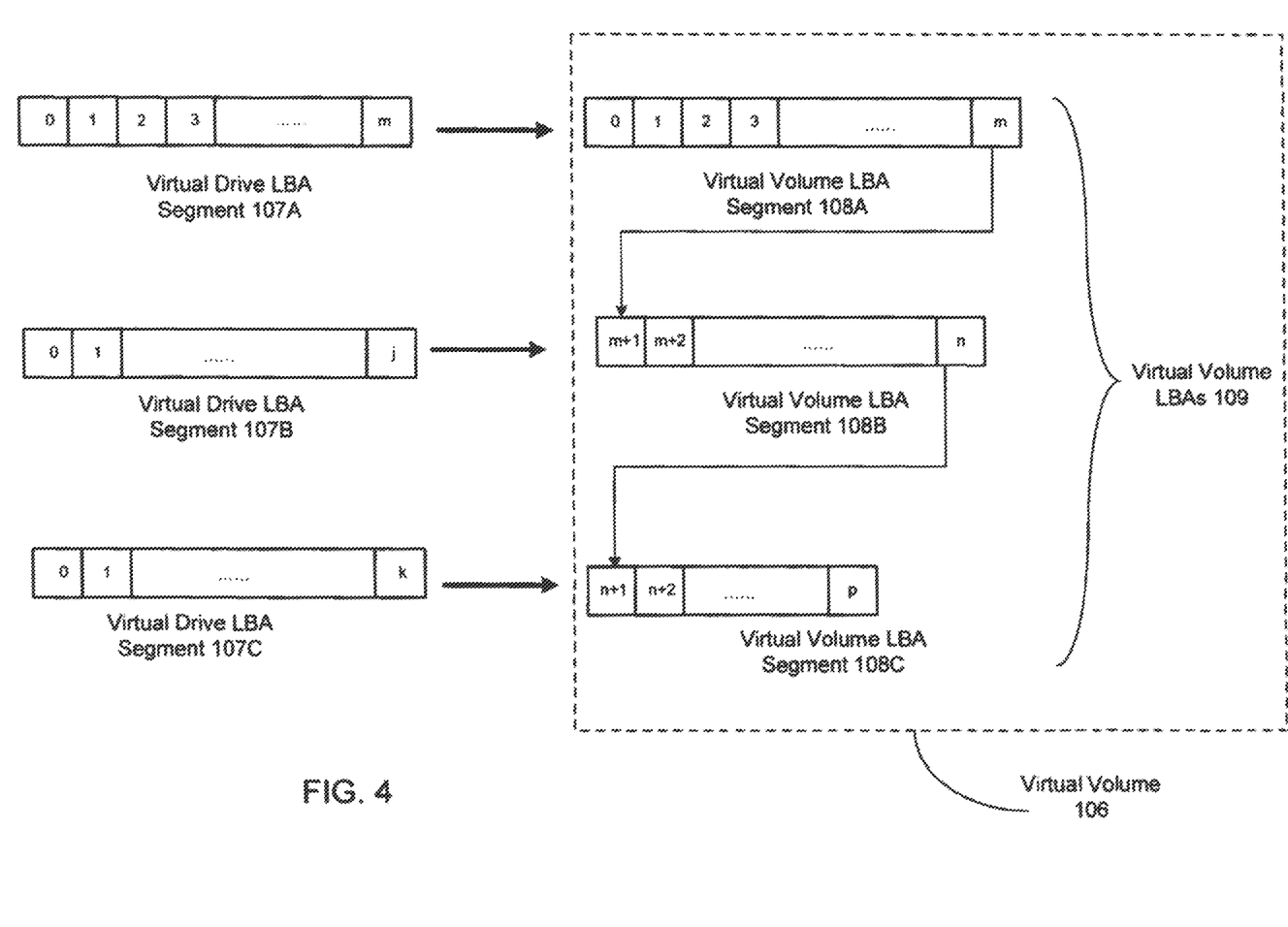
FIG. 4 shows a data storage system.

Referring to FIGS. 3 and 4, a virtual volume may be mapped to one or more LBA ranges in one or more virtual drives (e.g. virtual drive segments). When a virtual volume is provisioned from one or more storage pools, a virtual volume segment may be created for each mapping of a virtual volume LBA range to a virtual drive LBA range. For example, a virtual volume LBA segment 108A may include LBAs 0 through m which are mapped to LBAs 0 through m of virtual drive 104A. A virtual volume LBA segment 108B may include LBAs m+1 through n which are mapped to LBAs 0 through j of virtual drive 104B. A virtual volume LBA segment 108C may include LBAs n+1 through p which are mapped to LBAs 0 through k of virtual drive 104C.

The mass storage system 100 may further implement snapshot functionality. Snapshot functionality allows for the creation and storage of one or more point-in-time (PiT) copies of a virtual volume (e.g. virtual volume 106A). When a PiT is created for a virtual volume, the contents of the virtual volume may frozen and a PiT Temporary Virtual Volume (PTVV) may be created that records all changes made to the virtual volume after the PiT was taken. Consequently, the original contents of the virtual volume are preserved at the time the PiT was created. Such a snapshot mechanism may be referred to as allocate-on-write or redirect-on-write (collectively "allocate-on-write") snapshots. Further, subsequent PiTs may be created for a given PTVV where a current PTVV is frozen and a new PTVV is created.

FIGS. 5-9 illustrate an operational flows representing example operations related to dynamic storage tiering. In FIGS. 5-9, discussion and explanation may be provided with respect to the above-described examples of FIGS. 1-4, and/or with respect to other examples and contexts. However, it should be understood that the operational flows may be executed in a number of other environments and contexts, and/or in modified versions of FIGS. 1-4. In addition, although the various operational flows are presented in the sequence(s) illustrated, it should be understood that the various operations may be performed in other orders than those which are illustrated, or may be performed concurrently.

Figure 5:
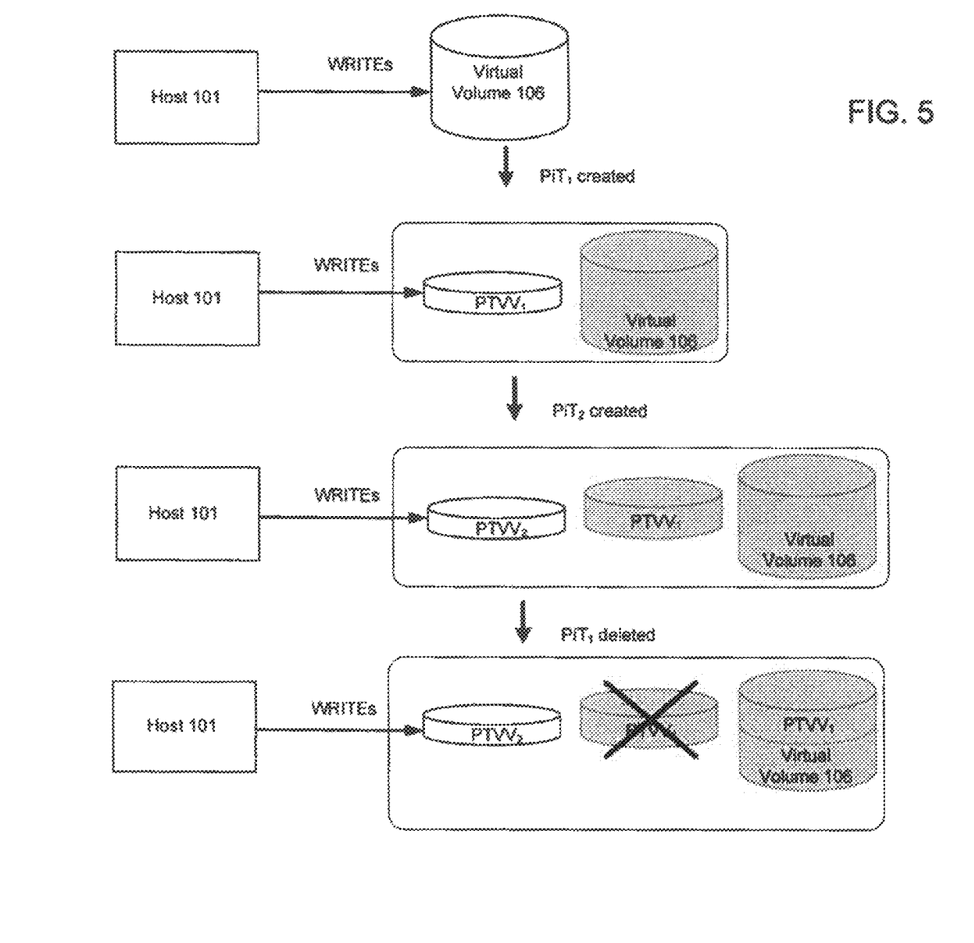
FIG. 5 shows an operational flow associated with dynamic storage tiering.

Referring to FIG. 5, an operational flow illustrating creating a point-in-time copy of a virtual volume including a storage hot-spot is shown. A first PiT (e.g. $PiT_1$) may occur which may freeze the contents of an original virtual volume (e.g. virtual volume 106A) and a first PTVV (e.g. $PTVV_1$) may be created. Following creation of the PTVV, write operations from a host (e.g. host 101) to the virtual volume may be directed to the PTVV. Read operations from the host to the virtual volume will be directed to the original virtual volume for data that is unmodified since the PiT and to the PTVV for data that has been modified since the PiT. The most recent PiT may be referred to as an "active" PiT as all current write operations are directed to its PTVV.

Subsequently, a second PiT (e.g. $PiT_2$) may occur which may freeze the contents of $PTVV_1$ and a second PTVV (e.g. $PTVV_2$) may be created. Following creation of the PTVV, write operations from the host to the virtual volume may be directed to the active PTVV (e.g. $PTVV_2$). Read operations from the host to the virtual volume will be directed to the original virtual volume for data that is unmodified since the first PiT (e.g. $PiT_1$), to the first PTVV (e.g. $PTVV_1$) for data which has been modified following the first PiT but prior to a second PiT (e.g. $PiT_2$), and to the active PTVV (e.g. $PTVV_2$) for data which has been modified following the second PiT.

Upon deletion of a PiT (e.g. $Pit_1$), the original virtual volume (e.g. virtual volume 106) may be reconfigured such that the contents of the portions of the original volume which were addressed by write requests during the existence of the PiT are updated to correspond with the PTVV. For example, the LBAs of the virtual volume 106 which were addressed by write requests to during the existence of the PiT may be copied to the LBAs of the virtual volume 106.

Figure 6:
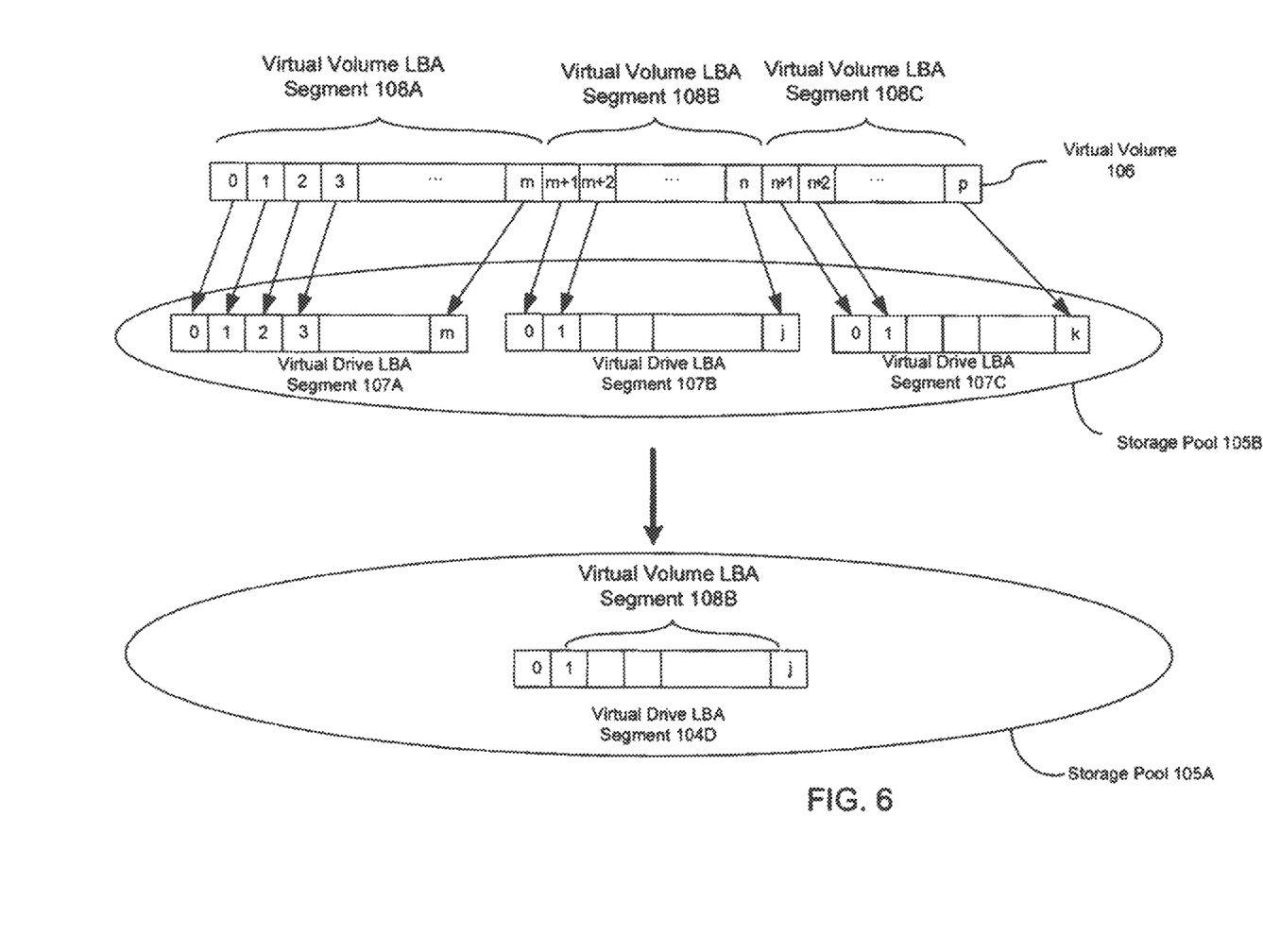
FIG. 6 shows an operational flow associated with dynamic storage tiering.

Referring to FIG. 6, an operational flow illustrating copying a virtual volume segment including the hot-spot from a first storage pool to a second storage pool is shown. For example, virtual drive LBA segment 107B (currently associated with the portion of virtual drive 104B located in storage pool 105B) may be copied to storage pool 105A. The copying of the virtual volume segment including the hot-spot may occur after the creation of a PiT for the associated virtual volume so as to ensure that modifications to the data in the virtual volume segment are maintained by the PiT for during the copy operation.

Figure 7:
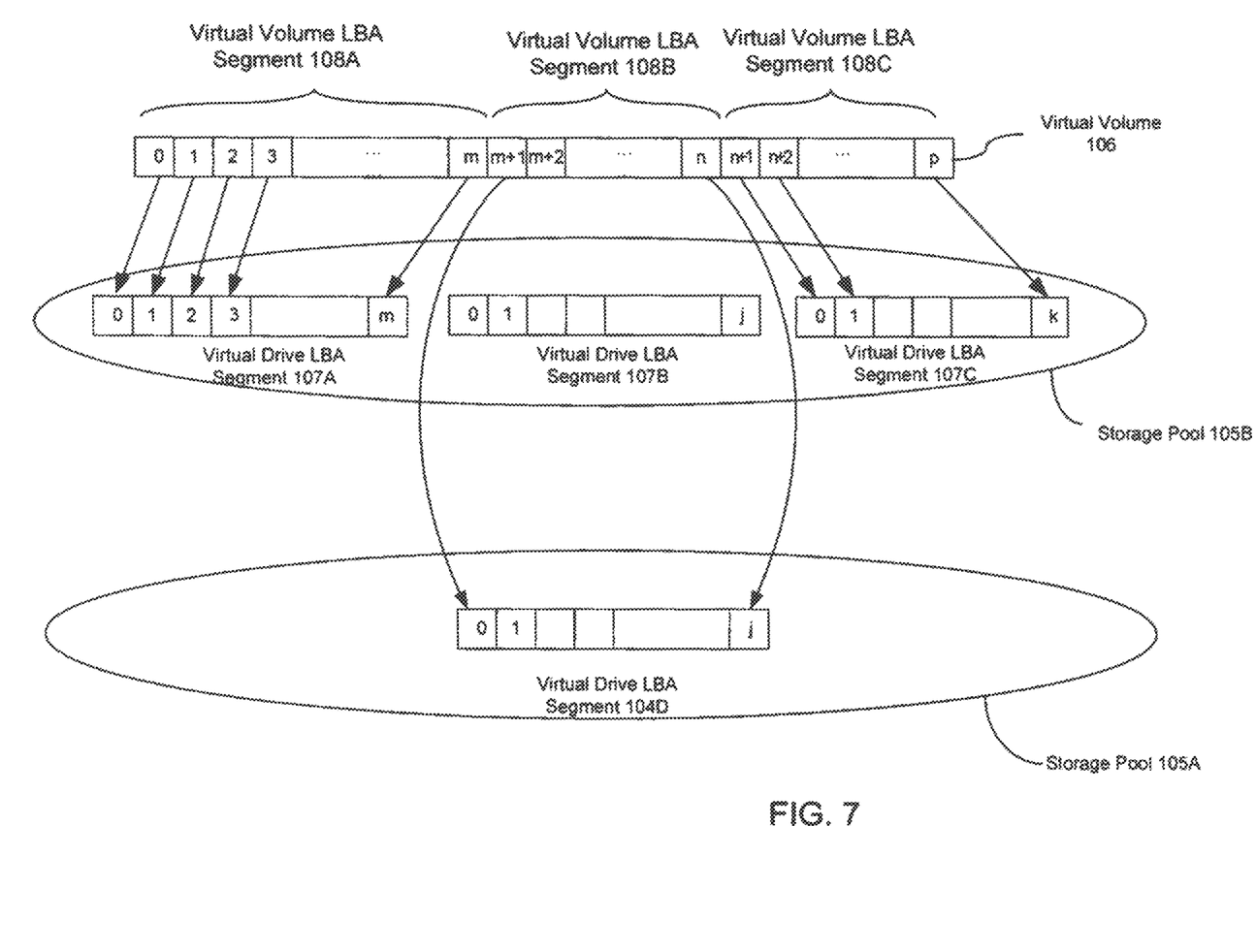
FIG. 7 shows an operational flow associated with dynamic storage tiering.

Referring to FIG. 7, an operational flow illustrating reconfiguring a logical block address mapping of the virtual volume to reference the virtual volume segment copy in the second storage pool is shown.

Figure 8:
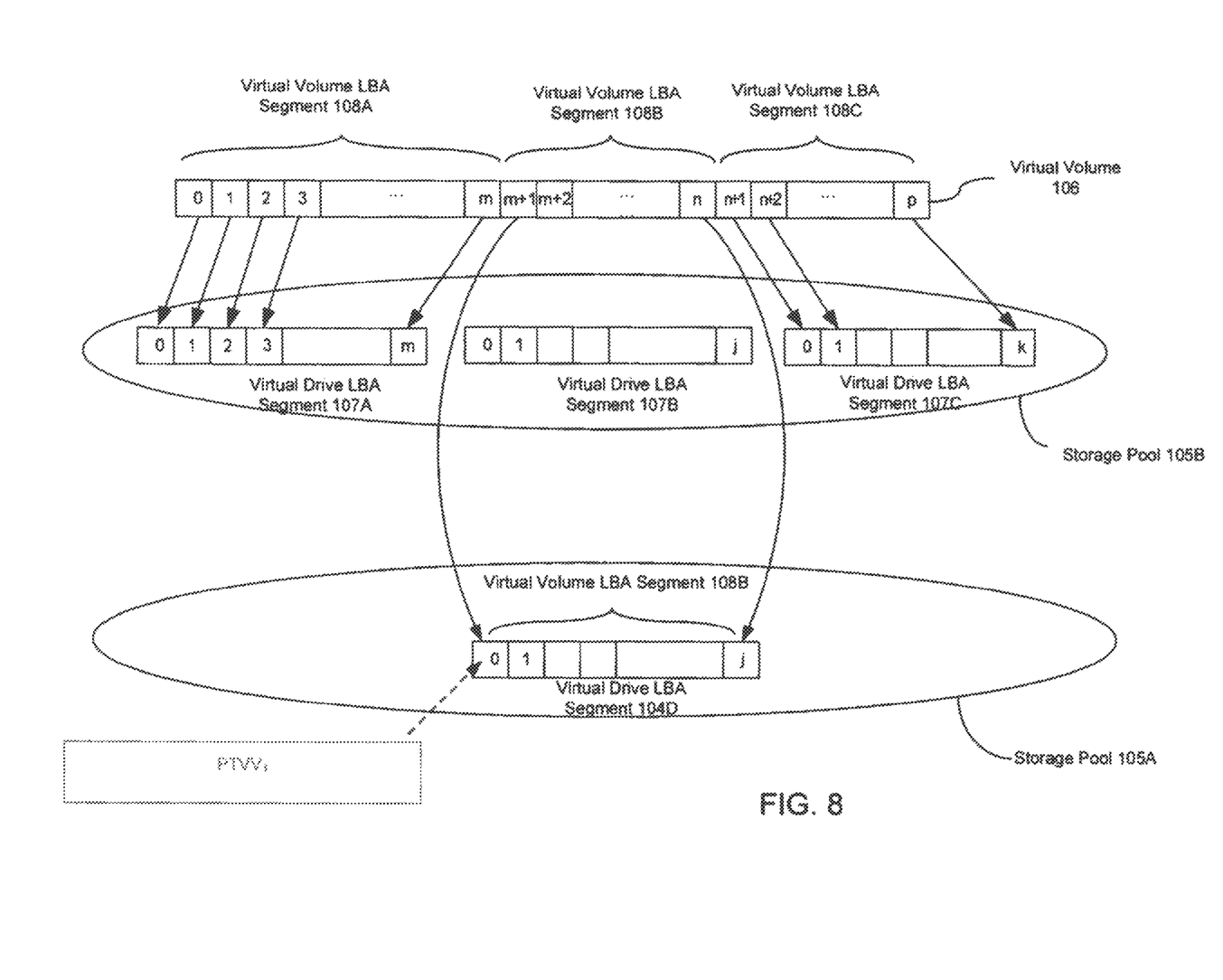
FIG. 8 shows an operational flow associated with dynamic storage tiering.

Referring to FIG. 8, an operational flow illustrating updating the virtual volume segment copy in the second storage pool with data from the secondary memory location is shown. As described above in reference to FIG. 5, a virtual volume (e.g. virtual volume 106) may be updated automatically upon the deletion of a PiT such that the contents of the virtual volume correspond to a PTVV associated with the PiT. For example, the segment of virtual volume 106 that has been shifted to a higher-performance storage pool (e.g. virtual drive 104D of storage pool 105A) may be updated to correspond with previously created $PTVV_1$. The data in the LBAs of $PTVV_1$ may be copied to the virtual drive LBA segment 107D on the virtual drive 104D, thereby deleting the PiT associated with $PTVV_1$.

Figure 9:
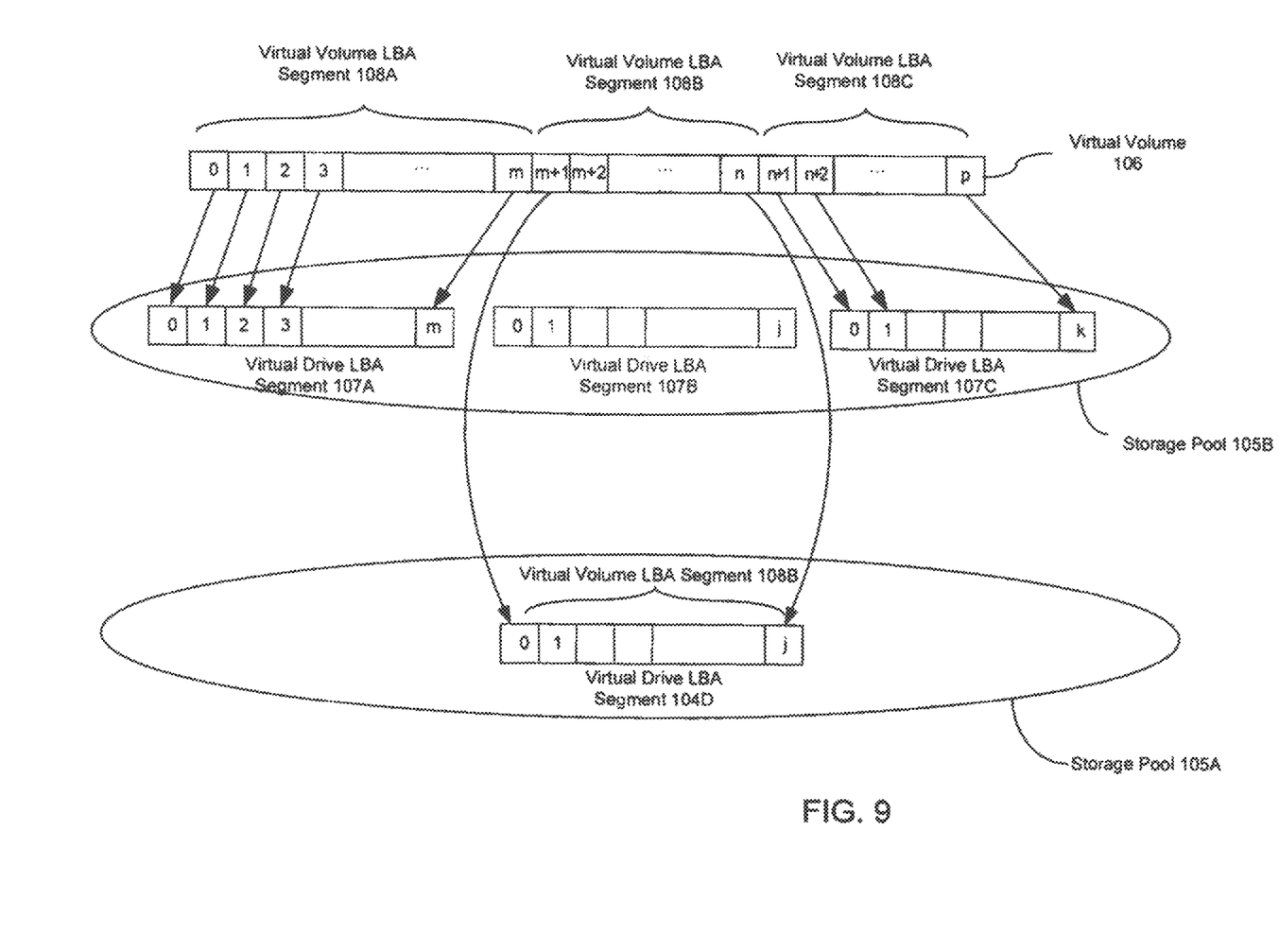
FIG. 9 shows an operational flow associated with dynamic storage tiering.

Referring to FIG. 9, an operational flow illustrating de-allocating the virtual volume segment including the hot-spot from the virtual volume of the first storage pool is shown. For example, upon the copying of virtual drive LBA segment 107B to storage pool 105A, the virtual drive LBA segment 107B of storage pool 105B may be de-allocated and the portion of the virtual drive 104B previously associated with virtual drive LBA segment 107B may be returned to the available system memory pool.

It is believed that the present invention and many of its attendant advantages will be understood by the foregoing description. It may be also believed that it will be apparent that various changes may be made in the form, construction and arrangement of the components thereof without departing from the scope and spirit of the invention or without sacrificing all of its material advantages. The form herein before described being merely an explanatory embodiment thereof. It may be the intention of the following claims to encompass and include such changes.

The foregoing detailed description may include set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein may be capable of being distributed as a program product in a variety of forms, and that an illustrative embodiment of the subject matter described herein applies regardless of the particular type of signal bearing medium used to actually carry out the distribution. Examples of a signal bearing medium include, but may be not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

Those having skill in the art will recognize that the state of the art may include progressed to the point where there may be little distinction left between hardware, software, and/or firmware implementations of aspects of systems; the use of hardware, software, and/or firmware may be generally (but not always, in that in certain contexts the choice between hardware and software may become significant) a design choice representing cost vs. efficiency tradeoffs. Those having skill in the art will appreciate that there may be various vehicles by which processes and/or systems and/or other technologies described herein may be effected (e.g., hardware, software, and/or firmware), and that the preferred vehicle will vary with the context in which the processes and/or systems and/or other technologies may be deployed. For example, if an implementer determines that speed and accuracy may be paramount, the implementer may opt for a mainly hardware and/or firmware vehicle; alternatively, if flexibility may be paramount, the implementer may opt for a mainly software implementation; or, yet again alternatively, the implementer may opt for some combination of hardware, software, and/or firmware. Hence, there may be several possible vehicles by which the processes and/or devices and/or other technologies described herein may be effected, none of which may be inherently superior to the other in that any vehicle to be utilized may be a choice dependent upon the context in which the vehicle will be deployed and the specific concerns (e.g., speed, flexibility, or predictability) of the implementer, any of which may vary. Those skilled in the art will recognize that optical aspects of implementations will typically employ optically oriented hardware, software, and or firmware.

What is claimed is:

1. A method for dynamic storage tiering comprising:
creating a point-in-time copy of a virtual volume including at least one of a storage hot-spot and a storage cold-spot;
redirecting write operations directed to the virtual volume to a point-in-time temporary virtual volume;
copying a virtual volume segment including at least one of the hot-spot and the cold-spot from a first storage pool to a second storage pool;
reconfiguring a logical block address mapping of the virtual volume to reference the virtual volume segment copy in the second storage pool; and
updating the virtual volume segment copy in the second storage pool with data from the point-in-time temporary virtual volume upon deletion of the point-in-time copy of the virtual volume.

2. The method of claim 1, wherein the copying a virtual volume segment including at least one of the hot-spot and the cold-spot from a first storage pool to a second storage pool comprises:
copying the virtual volume segment including at least one of the hot-spot and the cold-spot to a virtual volume segment of a higher-performance storage pool.

3. The method of claim 1, wherein the copying a virtual volume segment including at least one of the hot-spot and the cold-spot from a first storage pool to a second storage pool comprises:
copying the virtual volume segment including at least one of the hot-spot and the cold-spot to a virtual volume segment of a lower-performance storage pool.

4. The method of claim 1, further comprising:
de-allocating the virtual volume segment including at least one of the hot-spot and the cold-spot from the virtual volume of the first storage pool.

5. A system for dynamic storage tiering comprising:
means for creating a point-in-time copy of a virtual volume including at least one of a storage hot-spot and a storage cold-spot;
means for redirecting write operations directed to the virtual volume to a point-in-time temporary virtual volume;
means for copying a virtual volume segment including at least one of the hot-spot and the cold-spot from a first storage pool to a second storage pool;
means for reconfiguring a logical block address mapping of the virtual volume to reference the virtual volume segment copy in the second storage pool; and
means for updating the virtual volume segment copy in the second storage pool with data from the point-in-time temporary virtual volume upon deletion of the point-in-time copy of the virtual volume.

6. The system of claim 5, wherein the means for copying a virtual volume segment including at least one of the hot-spot and the cold-spot from a first storage pool to a second storage pool comprises:
means for copying the virtual volume segment including at least one of the hot-spot and the cold-spot to a virtual volume segment of a higher-performance storage pool.

7. The system of claim 6, wherein the means for copying a virtual volume segment including at least one of the hot-spot and the cold-spot from a first storage pool to a second storage pool comprises:
means for copying the virtual volume segment including at least one of the hot-spot and the cold-spot to a virtual volume segment of a lower-performance storage pool.

8. The system of claim 7, further comprising:
means for de-allocating the virtual volume segment including at least one of the hot-spot and the cold-spot from the virtual volume of the first storage pool.

9. A system for dynamic storage tiering comprising:
circuitry for creating a point-in-time copy of a virtual volume including at least one of a storage hot-spot and a storage cold-spot;

circuitry for redirecting write operations directed to the virtual volume to a point-in-time temporary virtual volume;

circuitry for copying a virtual volume segment including at least one of the hot-spot and the cold-spot from a first storage pool to a second storage pool;

circuitry for reconfiguring a logical block address mapping of the virtual volume to reference the virtual volume segment copy in the second storage pool; and circuitry for updating the virtual volume segment copy in the second storage pool with data from the point-in-time temporary virtual volume upon deletion of the point-in-time copy of the virtual volume.

10. The system of claim 9, wherein the circuitry for copying a virtual volume segment including at least one of the hot-spot and the cold-spot from a first storage pool to a second storage pool comprises:

circuitry for copying the virtual volume segment including at least one of the hot-spot and the cold-spot to a virtual volume segment of a higher-performance storage pool.

11. The system of claim 10, wherein the circuitry for copying a virtual volume segment including at least one of the hot-spot and the cold-spot from a first storage pool to a second storage pool comprises:

circuitry for copying the virtual volume segment including at least one of the hot-spot and the cold-spot to a virtual volume segment of a lower-performance storage pool.

12. The system of claim 11, further comprising: hot-spot and the cold-spot from the virtual volume of the first storage pool.

\* \* \* \* \*